(12) United States Patent
Alizad et al.

(10) Patent No.: US 12,700,093 B2
(45) Date of Patent: Aug. 4, 2026

(54) SYSTEMS AND METHODS FOR NOISE SUPPRESSION IN MICROVESSEL ULTRASOUND IMAGING

(71) Applicant: Mayo Foundation for Medical Education and Research, Rochester, MN (US)

(72) Inventors: Azra Alizad, Rochester, MN (US); Mostafa Fatemi, Rochester, MN (US); Rohit Nayak, Rochester, NY (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 330 days.

(21) Appl. No.: 18/563,831

(22) PCT Filed: May 27, 2022

(86) PCT No.: PCT/US2022/031353
§ 371 (c)(1),
(2) Date: Nov. 22, 2023

(87) PCT Pub. No.: WO2022/251641
PCT Pub. Date: Dec. 1, 2022

(65) Prior Publication Data
US 2024/0242348 A1 Jul. 18, 2024

Related U.S. Application Data

(60) Provisional application No. 63/194,017, filed on May 27, 2021.

(51) Int. Cl.
*G06K 9/00* (2022.01)
*G06T 7/00* (2017.01)

(52) U.S. Cl.
CPC ................................. *G06T 7/0012* (2013.01)

(58) Field of Classification Search
USPC ................. 382/100, 128–133, 156, 305, 312
See application file for complete search history.

(56) References Cited

U.S. PATENT DOCUMENTS

| | | | | |
|---|---|---|---|---|
| 11,294,052 B2* | 4/2022 | Insana | .................... | G16H 50/30 |
| 12,150,813 B2* | 11/2024 | Pinton | .................... | G01S 15/899 |
| 2018/0220997 A1* | 8/2018 | Song | .................... | G16H 50/30 |
| 2019/0380684 A1* | 12/2019 | Insana | .................. | A61B 8/5207 |
| 2020/0187910 A1* | 6/2020 | Pinton | .................... | A61B 8/085 |

FOREIGN PATENT DOCUMENTS

| | | |
|---|---|---|
| WO | 2018/222724 A1 | 12/2018 |
| WO | 2020/146880 A1 | 7/2020 |

OTHER PUBLICATIONS

Bayat, M. et al., Background Removal and Vessel Filtering of Noncontrast Ultrasound Images of Microvasculature, IEEE Transactions on Biomedical Engineering, 2018, 66(3): 831-842.

(Continued)

*Primary Examiner* — Seyed H Azarian
(74) *Attorney, Agent, or Firm* — Quarles & Brady LLP

(57) ABSTRACT

Described here are systems and methods for generating microvessel images from image data acquired with an ultrasound system while analyzing the image data in real-time, or retrospectively, to adaptively suppress noise in the data.

20 Claims, 5 Drawing Sheets

(56) References Cited

OTHER PUBLICATIONS

Bercoff, J. et al., Angio PL.U.S. PLaneWave Ultrasensitive (TM) Ultrasound Imaging, White Paper, Copyright 2016 SuperSonic Imagine S.A., 8 pages.

Demene, C. et al., Spatiotemporal Clutter Filtering of Ultrafast Ultrasound Data Highly Increases Doppler and fUltrasound Sensitivity, IEEE Transactions on Medical Imaging, 2015, 34(11):2271-2285.

Hata, J., Seeing the Unseen, New Techniques in Vascular Imaging, Superb Micro-Vascular Imaging, Copyright Toshiba Medical Systems Corporation 2014, 8 pages.

Nayak, R. et al., Adaptive Background Noise Bias Suppression in Contrast-Free Ultrasound Microvascular Imaging, Physics in Medicine & Biology, 2019, 64:245015, 22 pages.

Song, P. et al., Noise Equalization for Ultrafast Plane Wave Microvessel Imaging, IEEE Transactions on Ultrasonics, Ferroelectrics, and Frequency Control, 2017, 64(11):1776-1781.

Song, P. et al., Singular Value Decomposition-Based Noise Equalization for Ultrafast Plane Wave Microvessel Imaging, 2017 IEEE International Ultrasonics Symposium (IUS), 2017, pp. 1-1.

Song, P. et al., Ultrasound Small Vessel Imaging With Block-Wise Adaptive Local Clutter Filtering, IEEE Transactions on Medical Imaging, 2017, 36(1):251-262.

PCT International Search Report and Written Opinion, PCT/US2022/031353, Sep. 28, 2022, 14 pages.

* cited by examiner

SYSTEMS AND METHODS FOR NOISE SUPPRESSION IN MICROVESSEL ULTRASOUND IMAGING

CROSS-REFERENCE TO RELATED APPLICATIONS

This application represents the national stage entry of PCT/US2022/031353 filed on May 27, 2022 and claims the benefit of U.S. Provisional Patent Application Ser. No. 63/194,017 filed on May 27, 2021 and entitled "Systems and Methods for Noise Suppression in Microvessel Ultrasound Imaging," the contents of which is incorporated herein by reference as if set forth in its entirety for all purposes.

STATEMENT REGARDING FEDERALLY SPONSORED RESEARCH

This invention was made with government support under CA239548 awarded by the National Institutes of Health. The government has certain rights in the invention.

BACKGROUND

Microvascular blood flow imaging plays a pivotal role in clinical diagnosis. Recent developments in high frame-rate ultrasound imaging combined with higher order spatiotemporal clutter-filtering has dramatically improved the sensitivity of ultrasound imaging in detecting microvascular blood flow, without any use of contrast agents. One of the major challenges with ultrasound based microvascular blood flow imaging, however, is suppressing the background noise that emanates from time-gain compensation of the depth-attenuated ultrasound signal. Tissue motion is also typically unavoidable, and primarily emanates from physiological or external factors (sonographer's hand movement, patient bodily movements during acquisition, and the like). Although these imaging technologies are easy to practice, visualization of microvasculature in organs and tissues is commonly corrupted by the background noise.

Suppressing background noise in such circumstances is tremendously challenging, and conventional techniques are unable to address this issue. Conventional techniques may also fail in the presence of large tissue motion. Previous techniques have also required an entire clutter-filtered ensemble to be used to suppress background noise bias. Accordingly, miss-registered frames in the ensemble due to tissue motion can lead to poor estimation of the synthetic noise image, leading to sub-optimal suppression of the background noise bias in the microvascular images. Addressing this issue can be a highly complicated and resource-intensive process, and its performance may be dependent on the efficacy of motion correction. Such conventional techniques may be ineffective in the presence of large motion incurring speckle decorrelation or out-of-plane motion, which cannot be tracked.

Thus there remains a need for noise bias suppression that is robust to tissue motion, and which may be used in microvascular blood flow imaging.

SUMMARY OF THE DISCLOSURE

The present disclosure addresses the aforementioned drawbacks by providing systems and methods for generating an image that depicts microvessels in a subject using an ultrasound system with suppressed background noise. An advantage of the provided systems and methods is that the need for motion estimation or correction in microvessel imaging may be mitigated or may not be used. In some configurations, the method may use a spatiotemporal correlation matrix to sub-divide the full ensemble into a plurality of sub-ensembles based on ensemble coherency. The frames in the sub-ensembles may be highly coherent owing to an ultrafast imaging framerate. The synthetic noise images may be estimated from each sub-ensemble, and averaged to generate the final background-suppressed microvascular image. Background noise bias in the microvascular image can be suppressed even without motion correction. The systems and methods in accordance with the present disclosure may also provide for more accurate real-time feedback while performing an imaging procedure.

In one configuration, a method is provided for generating an image that depicts microvessels in a subject using an ultrasound system. The method includes accessing with a computer system, ultrasound data acquired from a subject with an ultrasound system. The ultrasound data includes image frames obtained at a plurality of different time points. The method also includes generating spatiotemporal matrix data with the computer system by reformatting the ultrasound data as a Casorati matrix. The method also includes determining image frames that meet a similarity threshold and generating local spatiotemporal clutter-filtered data with the computer system by inputting the determined image frames that meet the similarity threshold to a clutter filter. The method also includes determining pixels related to flow-signal and background signal in the local spatiotemporal clutter-filtered data and generating a synthetic noise image with the computer system based on replacing select flow-signal pixels in the local spatiotemporal clutter-filtered data with background signal pixel values. The method also includes estimating background noise field data from the synthetic noise image using the computer system and generating a noise-suppressed image with the computer system by normalizing the image using the background noise field data, in which the noise-suppressed image depicts microvessels in the subject.

In one configuration, a system is provided for generating an image that depicts microvessels in a subject. The system includes an ultrasound system configured to acquire ultrasound data from a subject. The system also includes a computer system configured to: access the ultrasound data acquired from the subject, wherein the ultrasound data comprise image frames obtained at a plurality of different time points; generate spatiotemporal matrix data by reformatting the ultrasound data as a Casorati matrix; determine image frames that meet a similarity threshold; generate local spatiotemporal clutter-filtered data by inputting the determined image frames that meet the similarity threshold to a clutter filter; determine pixels related to flow-signal and background signal in the local spatiotemporal clutter-filtered data; generate a synthetic noise image based on replacing select flow-signal pixels in the local spatiotemporal clutter-filtered data with background signal pixel values; estimate background noise field data from the synthetic noise image; generate a noise-suppressed image by normalizing the image using the background noise field data, wherein the noise-suppressed image depicts microvessels in the subject.

The foregoing and other aspects and advantages of the present disclosure will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention.

DETAILED DESCRIPTION

Figure 1:
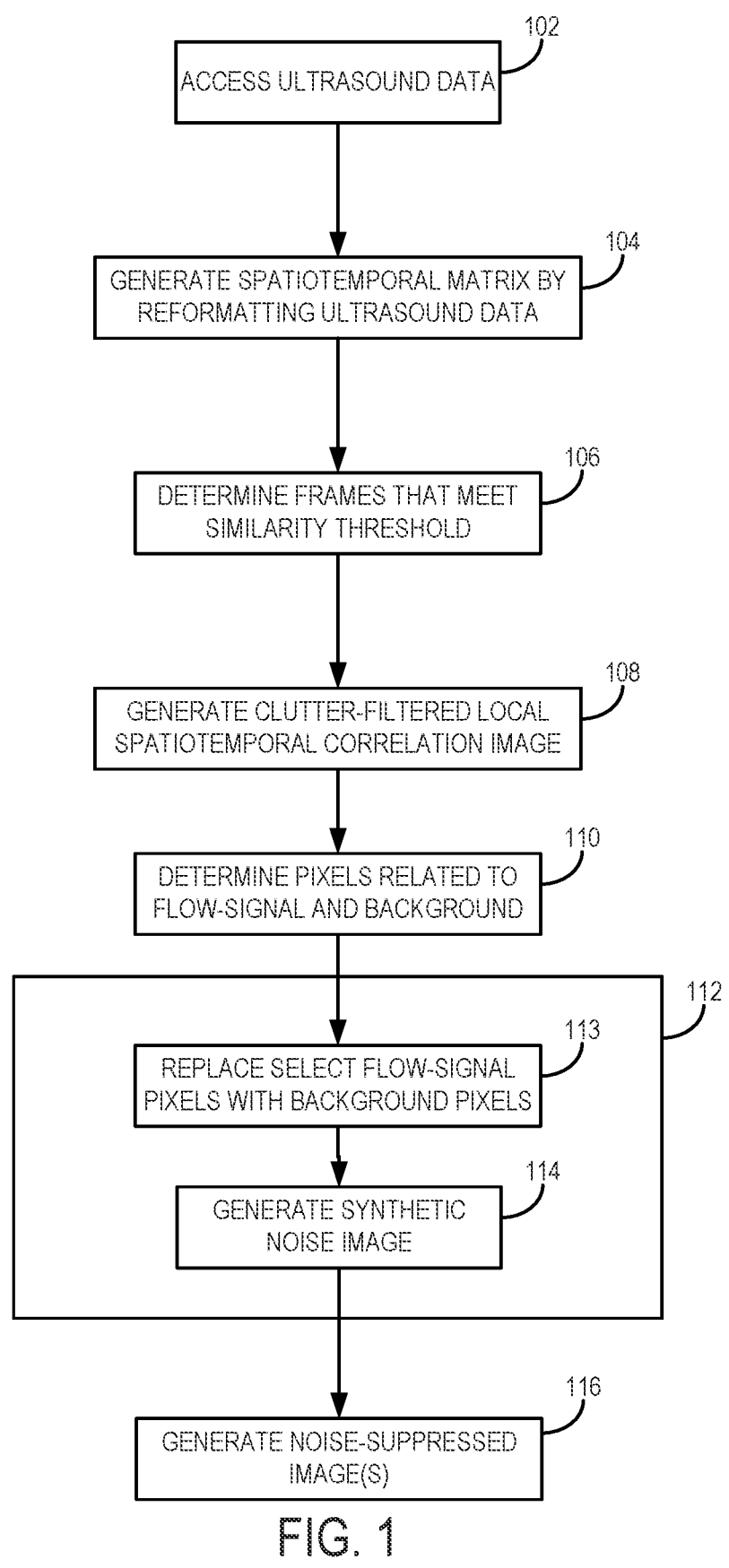
FIG. 1 is a flowchart setting forth the steps of an example method for adaptively suppressing or otherwise removing noise in ultrasound microvessel imaging.

Described herein are systems and methods for generating microvessel images from image data acquired with an ultrasound system with suppressed background noise. The need for motion estimation or correction in microvessel imaging may be mitigated in accordance with the present disclosure. In some configurations, the method may use a spatiotemporal correlation matrix to sub-divide the full ensemble into a plurality of sub-ensembles based on ensemble coherency. The frames in the sub-ensembles may be highly coherent owing to an ultrafast imaging framerate, and clusters of coherent frames may be identified from the spatiotemporal correlation matrix and adaptively used for background noise bias suppression. The synthetic noise images may be estimated from each sub-ensemble, and averaged to generate the final background-suppressed microvascular image. Background noise bias in the microvascular image can be suppressed even without motion correction.

The systems and methods in accordance with the present disclosure may also provide for more accurate real-time feedback while performing an imaging procedure. Noise suppression in accordance with the present disclosure may also work independently of vessel size, density, distribution, flow speed, depth, and the like, which may be needed for the quantitative assessment of vascular morphology.

In some aspects of the present disclosure, noise suppressed ultrasound microvasculature imaging is provided by performing an estimation of a spatiotemporal correlation matrix. The frames with highest similarity may be identified, such as by using a predetermined correlation threshold. In a non-limiting example, a threshold of 0.8 may be used. It is to be appreciated that other suitable threshold values may also be used. An estimate of a post-filtered local spatiotemporal correlation image may be used and pixels related to flow signal and background may be identified. A synthetic noise image may be formed where a frame may be randomly selected and flow signal pixels may be replaced with background pixels, such as from the entire ensemble. In a non-limiting example, background pixels replacing the flow pixels may be depth-matched within a tolerance value. The method may be repeated for a plurality of frames, or for all of the frames, and the respective synthetic noise images may be averaged to estimate a background noise image.

In a non-limiting example, the methods can be adaptive, highly efficient, and may thereby allow for real-time operation, unlike previous noise suppression and removal techniques, which are performed offline. Advantageously, the methods described in the present disclosure can be combined or implemented separately in order to generate high quality microvessel images.

For the purposes of this disclosure and accompanying claims, the term "real time" or related terms are used to refer to and define a real-time performance of a method or system, which is understood as performance that is subject to operational deadlines from a given event to a system's response to that event. For example, a real-time extraction of data and/or displaying of such data based on empirically-acquired signals may be one triggered and/or executed simultaneously with and without interruption of a signal-acquisition procedure. In a non-limiting example, a real-time operation may include a performance to be completed during a clinical setting, such as during or after acquiring an image.

A spatiotemporal correlation matrix, as noted above, can be computed based on spatiotemporal similarity between ultrasound data frames that have been reformatted into a Casorati matrix, or the like. This spatiotemporal correlation matrix indicates coherency of the power Doppler ensemble and can be estimated in a computationally inexpensive manner. In a non-limiting example, the spatiotemporal correlation matrix can, in some instances, be computed immediately after data acquisition.

A spatiotemporal correlation matrix may be used as a performance descriptor for non-contrast microvasculature ultrasound imaging. Image data may be processed to generate a spatiotemporal correlation matrix, and the image data may be acquired without the use of an ultrasound contrast agent (e.g., a microbubbles-based contrast agent). The image data may be two-dimensional image data or three-dimensional image data. In general, the image data are spatiotemporal data. For instance, the image data may represent a time series of two-dimensional image frames or three-dimensional image volumes. The image data may be reformatted as a Casorati matrix, or other similar matrix or data structure. For instance, the image data are reformatted as a Casorati matrix by vectorizing each image frame and arranging the vectorized image frames as the columns in the Casorati matrix. In this way, each column of the Casorati matrix corresponds to an image frame obtained from a different time point. The spatiotemporal correlation matrix may be estimated from the Casorati matrix by computing a similarity (or dissimilarity) metric of each column of the Casorati matrix with every other column in the Casorati matrix.

For example, each entry (i, j) of the spatiotemporal correlation matrix, M, can be computed as a correlation coefficient as follows:

$$M_{i,j} = \frac{\sum\limits_{n=1}^{N} C_i(n) * C_j(n)}{\sqrt{\sum\limits_{n=1}^{N} C_i(n)^2 \sum\limits_{n=1}^{N} C_j(n)^2}}; \tag{1}$$

where $C_i$ and $C_j$ are the (i, j) columns of the Casorati matrix, respectively, n represents the integer row of the Casorati matrix, and N denotes the number of rows in the Casorati matrix. The entries in the spatiotemporal correlation matrix will range in values between 0 and 1, where a value of 1 indicates perfect registration between the two images (i.e., the two Casorati columns). In some non-limiting examples, the similarity metric may be a covariance metric, the angle or magnitude of column vectors in the Casorati matrix, or a distance metric (e.g., Euclidian distance, Manhattan distance, Mahalanobis distance, Minkowski distance), and the like. In some non-limiting examples, the spatiotemporal correlation matrix is computed from all of the pixels in the image. In some non-limiting examples, the spatiotemporal correlation matrix can be computed from only a subset of the pixels in an image. For example, a local region can be selected and the spatiotemporal correlation matrix can be computed based on the pixels associated with that local region. The spatiotemporal correlation matrix can be quantitatively summarized by statistics (e.g., mean, median) to measure performance. Such performance metrics can be provided on a range of 0-1, 0%-100%, or another suitable range.

Because every column of the Casorati matrix represents a vectorized image (e.g., a vectorized 2D image) at a time, f, the normalized correlation of any two columns can quantify the similarity between the two respective images. In the absence of motion, all of the images of the power Doppler ensemble should ideally be the same over the acquisition duration; that is, all columns of the Casorati matrix should be same. In this ideal scenario, the spatiotemporal correlation matrix would have unitary rank. Consequently, this would lead to very high correlation values in the spatiotemporal correlation matrix (e.g., values close to 1). However, motion is unavoidable in a clinical setup, whether the motion is caused by physiological sources (e.g., cardiac pulsation), the sonographer's hand motion, the patient's body motion, or the like.

In some configurations, background noise bias in the microvascular image can be suppressed even without motion correction. Clutter filtering techniques (e.g., SVD-based spatiotemporal clutter filtering) may also be used to effectively suppress tissue clutter even in the presence of motion.

Adaptive Noise Suppression

Non-invasive, contrast-free imaging of small vessel blood flow is diagnostically invaluable for detection, diagnosis, and monitoring of disease. Recent advances in ultrafast imaging and tissue clutter-filtering have considerably improved the sensitivity of power Doppler ("PD") imaging in detecting small vessel blood flow. Suppression of tissue clutter can, however, expose the depth-dependent time-gain compensated noise bias, which may noticeably degrade the PD image.

Using the methods described in the present disclosure, adaptive background suppression of PD images based on a noise bias estimated from clusters of coherent frames identified from the spatiotemporal correlation matrix can considerably improve flow signal visualization compared to currently existing techniques. As described below, the methods described in the present disclosure can advantageously separate the background signal and blood flow components, which can otherwise be challenging to reliably separate, such as in the presence of large motion.

Referring to FIG. 1, a flowchart is illustrated as setting forth the steps of an example method for adaptively suppressing or otherwise removing noise in ultrasound microvessel imaging, which may be implemented in real-time or retrospectively.

The method includes accessing ultrasound data with a computer system, as indicated at step 102. Accessing ultrasound data can include retrieving previously acquired ultrasound data from a memory or other data storage device or medium. In other instances, the ultrasound data can be accessed by acquiring the ultrasound data with an ultrasound system and communicating, transferring, or otherwise providing the acquired ultrasound data to the computer system. In these instances, the ultrasound data can be provided to the computer system in real-time while the data are being acquired, or after the data have been acquired.

As one non-limiting example, the ultrasound data may be ultrasound in-phase and quadrature ("IQ") data or radio frequency (RF) data, which may be acquired using plane wave ("PW") or other suitable imaging techniques. For instance, plane wave IQ data can be acquired using a number of different angular insonifications (e.g., $-3°$, $-2°$, $-1°$, $0°$, $+1°$, $+2°$, $+3°$), which can then be coherently compounded, such as after delay-and-sum beamforming, to produce a single IQ frame that is dynamically focused on both transmit and receive. The ultrasound data may be acquired without the use of an ultrasound contrast agent (e.g., a microbubbles-based contrast agent). The image ultrasound may be two-dimensional image data or three-dimensional image data. The ultrasound data may be spatiotemporal data. For instance, the ultrasound data may represent a time series of two-dimensional image frames or three-dimensional image volumes.

The ultrasound data (e.g., high frame-rate compounded plane wave ultrasound images) may be rearranged in a spatiotemporal matrix (e.g., a Casorati matrix), as indicated at step 104. Frames with a correlation that meet a determined similarity threshold, such as a non-limiting example threshold of 0.8, may be determined at step 106.

In some configurations, tissue clutter may be suppressed by inputting the spatiotemporal matrix to a singular value decomposition ("SVD"), generating output as a clutter-filtered local spatiotemporal correlation image, as indicated at step 108. In a non-limiting example, the following SVD can be implemented:

$$S_{blood} = S(x, z, t) - \sum_{r=1}^{r=th} U_r \lambda_r V_r^*; \tag{2}$$

where the matrices S and $S_{blood}$ represent pre-clutter filtered and post-clutter filtered data. The matrices U and V are left and right singular orthonormal vectors, respectively. The corresponding singular values and their orders are denoted by $\lambda_r$ and r, respectively, and "*" represents the conjugate transpose. A global SV threshold (th) for separation of tissue clutter from blood signal can be selected, for example, based on the decay of the double derivative of the singular value orders (e.g., when the double derivative approaches zero).

Pixels related to flow-signal and background signal in the local spatiotemporal correlation image may be determined at step 110. Identification of whether a pixel is related to flow-signal or background signal may be based upon a segmented location, such as if a pixel is located within a lumen or vessel it may be identified as flow-signal related. If a pixel is located outside of a region of interest, or outside of a vessel, it may be identified as being related to background signal.

A synthetic noise image is then generated, as generally indicated by process block 112. Selected flow-signal pixels may be replaced with background pixels at step 113. In a non-limiting example, a frame may be randomly selected, and selected flow-signal pixels may be replaced with randomly selected background pixels, such as background pixels from the entire ensemble. Replacing the flow-signal pixels with background pixels may be performed to generate a synthetic noise image at step 114. The background pixels replacing the flow pixels may be depth-matched within a specified tolerance, such as consistent with applied TGC settings. At step 112, the process of generating a synthetic noise image may be repeated to include the full number of frames. The average of the respective synthetic noise images may be used to estimate the background noise image. In a non-limiting example, step 112 may be repeated for a plurality of frames, such as up to 200 frames, and the average of the respective synthetic noise images may be used to estimate the background noise image.

As one non-limiting example, the synthetic noise image can be estimated at process block 114 as follows. A spatiotemporal correlation ("STC") filter can be used to identify the flow pixels in the clutter filtered local spatiotemporal correlation image, which are then replaced by randomly selected noise pixels from the local neighborhood, to generate the synthetic noise image. STC-based filtering of the clutter filtered local spatiotemporal correlation image can be performed in locally overlapping kernels of dimensions m×n×t pixels in axial, lateral, and temporal directions, respectively. The pixels within the 3D kernel can be arranged in the spatiotemporal matrix (e.g., space-time Casorati form) of dimension s×t, where s=m×n. The normalized correlation matrices M of dimension t×t can be computed:

$$M_{i,j} = \frac{\sum_{n=1}^{N} C_i(n) \times C_j(n)}{\sqrt{\sum_{n=1}^{N} C_i(n)^2 \times \sum_{n=1}^{N} C_j(n)^2}}; \quad (3)$$

where (i, j) corresponds to each entry in M. Further, $C_i$ and $C_j$ are the (i, j) columns of the spatiotemporal matrix (e.g., Casorati matrix), respectively, n represents the integer row, and N denotes the number of rows in the spatiotemporal (e.g., Casorati matrix). As described above, these normalized correlation matrices may also be referred to as a spatiotemporal correlation matrix. Thus, in some instances the synthetic noise image can be computed from a spatiotemporal correlation matrix, such as the motion matrices computed as described above. The spatiotemporal correlation matrix, M, quantifies the similarity of the pixels in the 3D kernel. Highly dissimilar pixels corresponding to noise will generally yield a low correlation value (e.g., approximately zero), whereas those associated with flow pixels will generally yield a relatively higher correlation value (e.g., greater than 0.4). This information can be used to synthesize a purely noise image as noted above, from which the inherent noise bias can be deduced.

As a non-limiting example, the synthetic noise image can be estimated based on mean values, or other statistical measures, of the normalized correlation matrices (or motion matrices). For instance, the mean of the estimated correlation matrices, which ranged between 0-1, can constitute the intensity of the pixels in the STC image. Specifically, the pixel intensity at location (x,z) in the STC image can be estimated by computing the mean of the correlation matrix, M, associated with the local kernel centered at (x,z) of the clutter filtered local spatiotemporal correlation image data.

The correlation values associated with flow pixels are relatively higher compared to noise. Accordingly, they can be separated based on gray-scale thresholding of the STC image. Because noise is expected to be statistically uniform across all columns and frames of the Doppler ensemble, the identified blood flow pixels can be replaced by noise pixels randomly selected from the lateral neighborhood, for each frame of clutter filtered local spatiotemporal correlation image data.

Further, because the amplification due to time gain compensation ("TGC") varies gradually across depth, the replacement noise pixels can be selected from over a range of depth (e.g., rows), without affecting the performance of the technique. As a non-limiting example, the gray scale threshold can be empirically chosen (e.g., a value of 0.30). Pixels with higher or lower STC values may be identified as blood vessel or noise, respectively. The local noise neighborhood can be limited to pixels, across rows, across columns, and across frames, respectively.

As one non-limiting example, the average of the respective synthetic noise images may be used to estimate the background noise image. The background noise image can be characterized by a smooth depth-increasing signal that is replicated across all columns of the image, consistent with the notion that TGC is applied uniformly across all receive channels. Accordingly, to derive the noise image that is repetitive across all columns of the synthetic noise image, a SVD-based or other low-rank matrix approximation can be implemented. For instance, the noise field can be reconstructed using the lowest singular order component that also corresponds to the highest singular value. In instances where the low-rank noise field is estimated from a single synthetic noise image, it may be advantageous to subsequently smooth the estimated noise image, such as by using a two-dimensional ("2D") least squares method that fits a 2D plane in locally overlapping kernels across the depth of the image. As one non-limiting example, the axial and lateral widths of the kernels can be on the order of 100 and 192 pixels, respectively. The kernels can overlap by one or more pixels. As one non-limiting example, the pixels can overlap by one pixel. In some non-limiting examples, the kernels can also be constrained to have zero-slope in the lateral direction.

Referring still to FIG. 1, a noise-suppressed image is generated using the estimated background noise image, as indicated at step 116. For example, a background-suppressed image can be computed by averaging the respective synthetic noise images to estimate the background noise image and normalizing the original image using the estimated background noise image. This corresponds to a subtraction of the estimated background noise field from the original image in the log scale that is used for image display. Accordingly, total suppression of noise bias can lead to as little as a 0 dB background signal.

Figure 2:
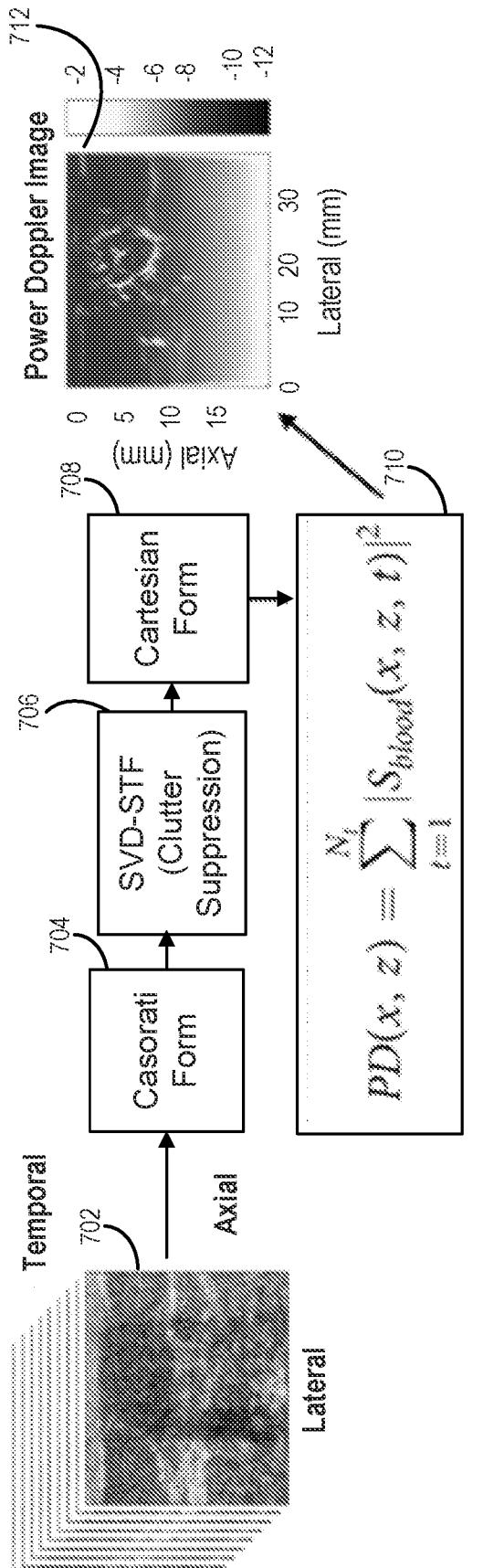
FIG. 2 shows an illustration of the different steps of an example noise-bias suppression algorithm.
Figure 2:
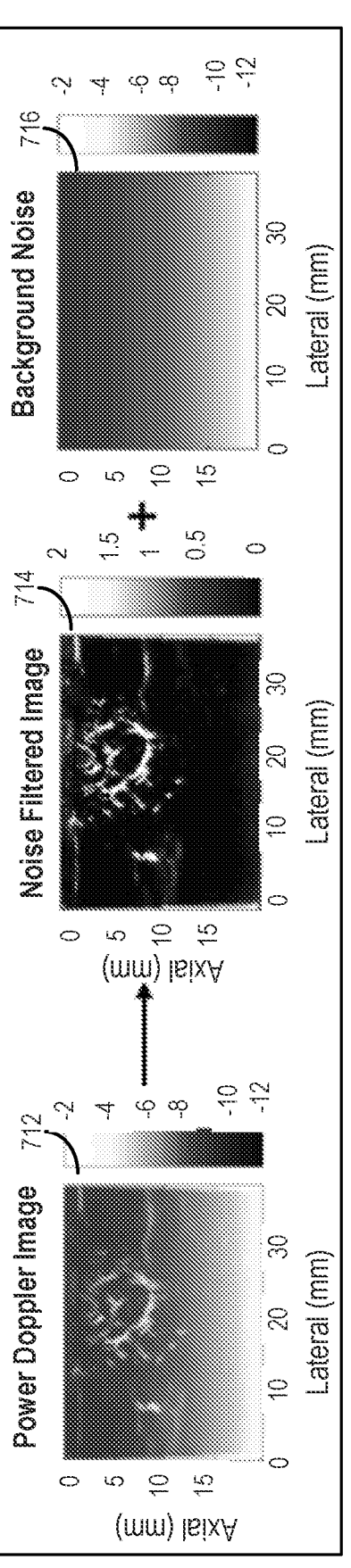

An illustrative example is shown in FIG. 2 to outline the different steps involved in an example method for estimating a synthetic noise image from a Doppler ensemble. The acquired Doppler ensemble 702 may be transformed into a Casorati form 704, and its corresponding clutter suppression SVD-STF form 706, which may include a Cartesian form 708. A Power Doppler (PD) conversion 710 may be used to generate a Power Doppler image 712. A noise filtered image 714 may be generated with a separate background noise image 716.

The noise field in the PD image may depend on multiple imaging parameters (e.g. TGC, imaging frequency, transmit waveform, and the like). Suppression of the noise bias using the methods described in the present disclosure may not change the morphological features of the vasculature or the relative intensity of the flow signal with respect to the background. Preserving vascular morphological features is advantageous because they carry important information about disease condition and are useful for robust quantitative assessment of the vasculature.

Example Systems

Figure 3:
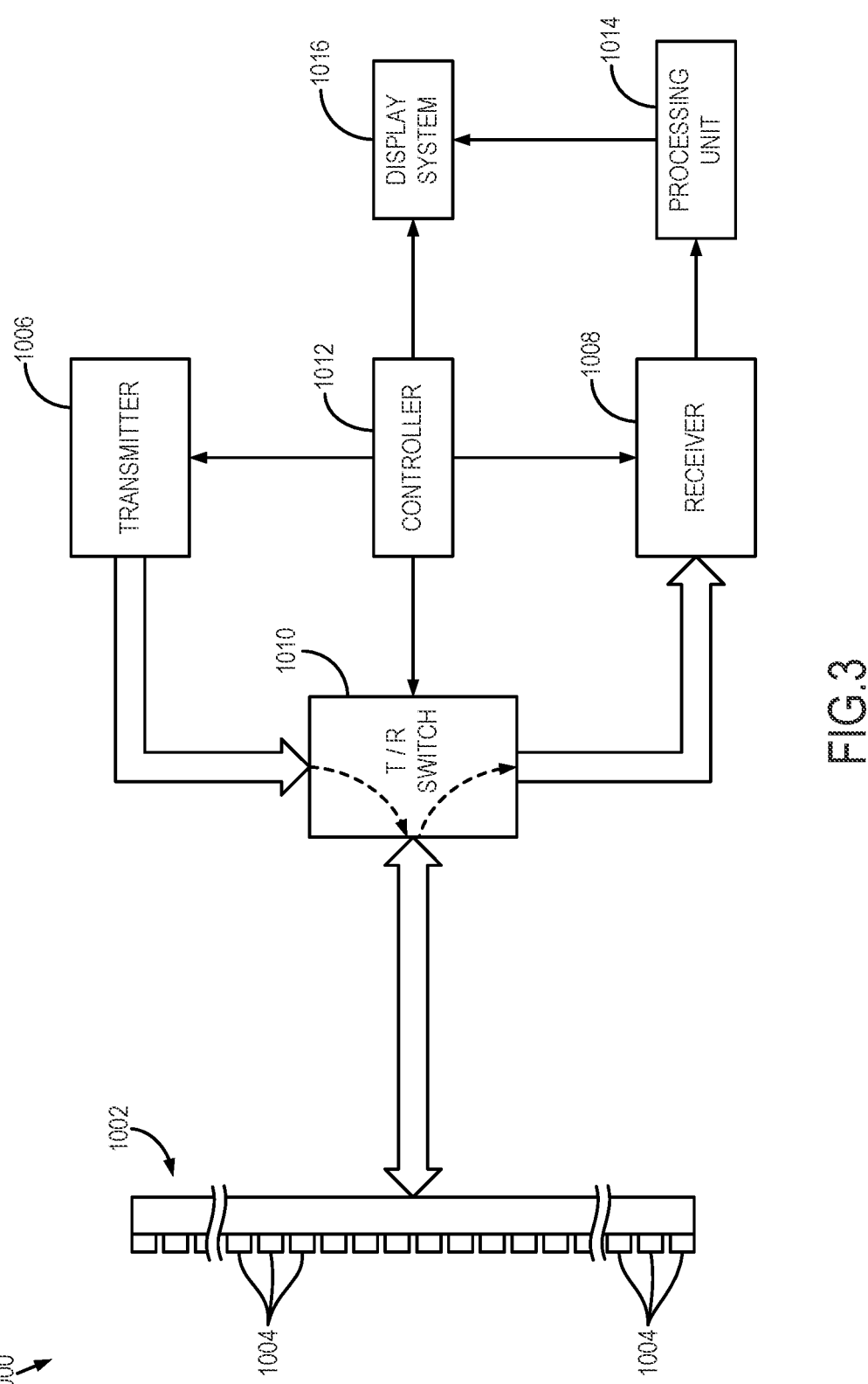
FIG. 3 is an example of an ultrasound system that can be implemented with the systems and methods described in the present disclosure.

FIG. 3 illustrates an example of an ultrasound system 800 that can implement the methods described in the present disclosure. The ultrasound system 800 includes a transducer array 802 that includes a plurality of separately driven transducer elements 804. The transducer array 802 can include any suitable ultrasound transducer array, including linear arrays, curved arrays, phased arrays, and so on. Similarly, the transducer array 802 can include a 1D transducer, a 1.5D transducer, a 1.75D transducer, a 2D transducer, a 3D transducer, and so on.

When energized by a transmitter 806, a given transducer element 804 produces a burst of ultrasonic energy. The ultrasonic energy reflected back to the transducer array 802 (e.g., an echo) from the object or subject under study is converted to an electrical signal (e.g., an echo signal) by each transducer element 804 and can be applied separately to a receiver 808 through a set of switches 810. The transmitter 806, receiver 808, and switches 810 are operated under the control of a controller 812, which may include one or more processors. As one example, the controller 812 can include a computer system.

The transmitter 806 can be programmed to transmit unfocused or focused ultrasound waves. In some configurations, the transmitter 806 can also be programmed to transmit diverged waves, spherical waves, cylindrical waves, plane waves, or combinations thereof. Furthermore, the transmitter 806 can be programmed to transmit spatially or temporally encoded pulses.

The receiver 808 can be programmed to implement a suitable detection sequence for the imaging task at hand. In some embodiments, the detection sequence can include one or more of line-by-line scanning, compounding plane wave imaging, synthetic aperture imaging, and compounding diverging beam imaging.

In some configurations, the transmitter 806 and the receiver 808 can be programmed to implement a high frame rate. For instance, a frame rate associated with an acquisition pulse repetition frequency ("PRF") of at least 100 Hz can be implemented. In some configurations, the ultrasound system 800 can sample and store at least one hundred ensembles of echo signals in the temporal direction. The controller 812 can be programmed to implement an imaging sequence to acquire ultrasound data. In some embodiments, the controller 812 receives user inputs defining various factors used in the imaging sequence.

A scan can be performed by setting the switches 810 to their transmit position, thereby directing the transmitter 806 to be turned on momentarily to energize transducer elements 804 during a single transmission event according to the imaging sequence. The switches 810 can then be set to their receive position and the subsequent echo signals produced by the transducer elements 804 in response to one or more detected echoes are measured and applied to the receiver 808. The separate echo signals from the transducer elements 804 can be combined in the receiver 808 to produce a single echo signal.

The echo signals are communicated to a processing unit 814, which may be implemented by a hardware processor and memory, to process echo signals or images generated from echo signals. As an example, the processing unit 814 can process image data to analyze and assess the quality and ensemble coherence of the image data using the methods described in the present disclosure. In response to this analysis, the processing unit 814 can direct and implement further processing of the image data, reconstruction of the image data to generate microvessel images, reacquisition of image data when image data are deemed unreliable, computation of one or more quality metrics (e.g., measures of ensemble coherency), and combinations thereof. Images produced from the echo signals by the processing unit 814 can be displayed on a display system 816.

Figure 4:
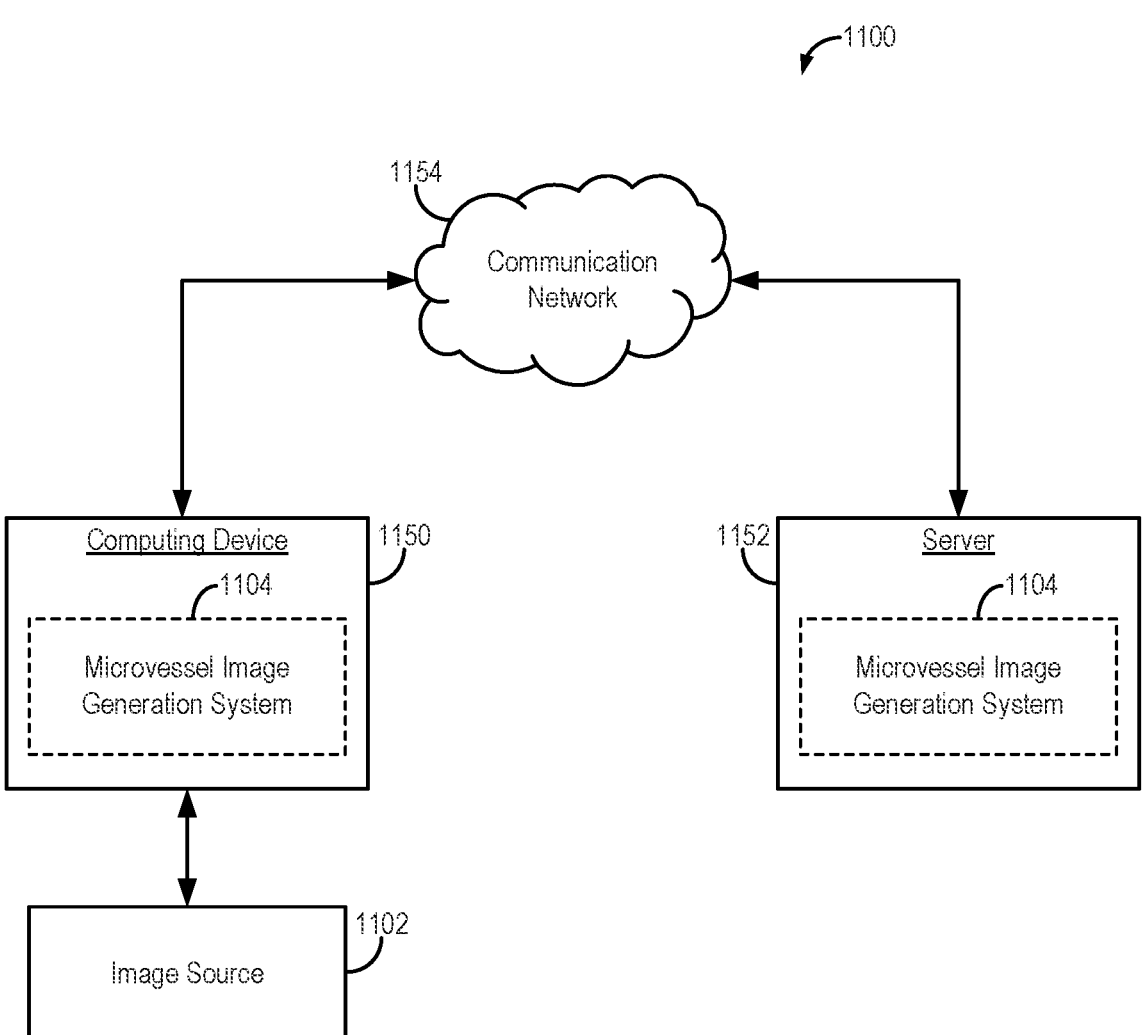
FIG. 4 is a block diagram of an example of a microvessel image generation system.

Referring now to FIG. 4, an example of a system 900 for generating microvessel images (e.g., microvessel blood flow images) in accordance with some embodiments of the systems and methods described in the present disclosure is shown. As shown in FIG. 4, a computing device 950 can receive one or more types of data (e.g., ultrasound data) from image source 902, which may be an ultrasound image source. In some embodiments, computing device 950 can execute at least a portion of a microvessel image generation system 904 to generate microvessel images from data received from the image source 902. As described above, the microvessel image generation system 904 can implement a performance description system for assessing data quality, motion correlation quality, or both, and for updating ultrasound data based on that performance description. The microvessel image generation system 904 can also implement an adaptive noise suppression system for suppressing or otherwise removing noise from the microvessel images. In still other examples, the microvessel image generation system 904 can implement both the performance description and adaptive noise suppression systems described in the present disclosure.

Additionally or alternatively, in some embodiments, the computing device 950 can communicate information about data received from the image source 902 to a server 952 over a communication network 954, which can execute at least a portion of the microvessel image generation system 904. In such embodiments, the server 952 can return information to the computing device 950 (and/or any other suitable computing device) indicative of an output of the microvessel image generation system 904.

In some embodiments, computing device 950 and/or server 952 can be any suitable computing device or combination of devices, such as a desktop computer, a laptop computer, a smartphone, a tablet computer, a wearable computer, a server computer, a virtual machine being executed by a physical computing device, and so on. The computing device 950 and/or server 952 can also reconstruct images from the data.

In some embodiments, image source 902 can be any suitable source of image data (e.g., measurement data, images reconstructed from measurement data), such as an ultrasound imaging system, another computing device (e.g., a server storing image data), and so on. In some embodiments, image source 902 can be local to computing device 950. For example, image source 902 can be incorporated with computing device 950 (e.g., computing device 950 can be configured as part of a device for capturing, scanning, and/or storing images). As another example, image source 902 can be connected to computing device 950 by a cable, a direct wireless link, and so on. Additionally or alternatively, in some embodiments, image source 902 can be located locally and/or remotely from computing device 950, and can communicate data to computing device 950 (and/or server 952) via a communication network (e.g., communication network 954).

In some embodiments, communication network 954 can be any suitable communication network or combination of communication networks. For example, communication network 954 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), a wired network, and so on. In some embodiments, communication network 954 can be a local area network, a wide area network, a public network (e.g., the Internet), a private or semi-private network (e.g., a corporate or university intranet), any other suitable type of network, or any suitable combination of networks. Communications links shown in FIG. 4 can each be any suitable communications link or combination of communications links, such as wired links, fiber optic links, Wi-Fi links, Bluetooth links, cellular links, and so on.

Figure 5:
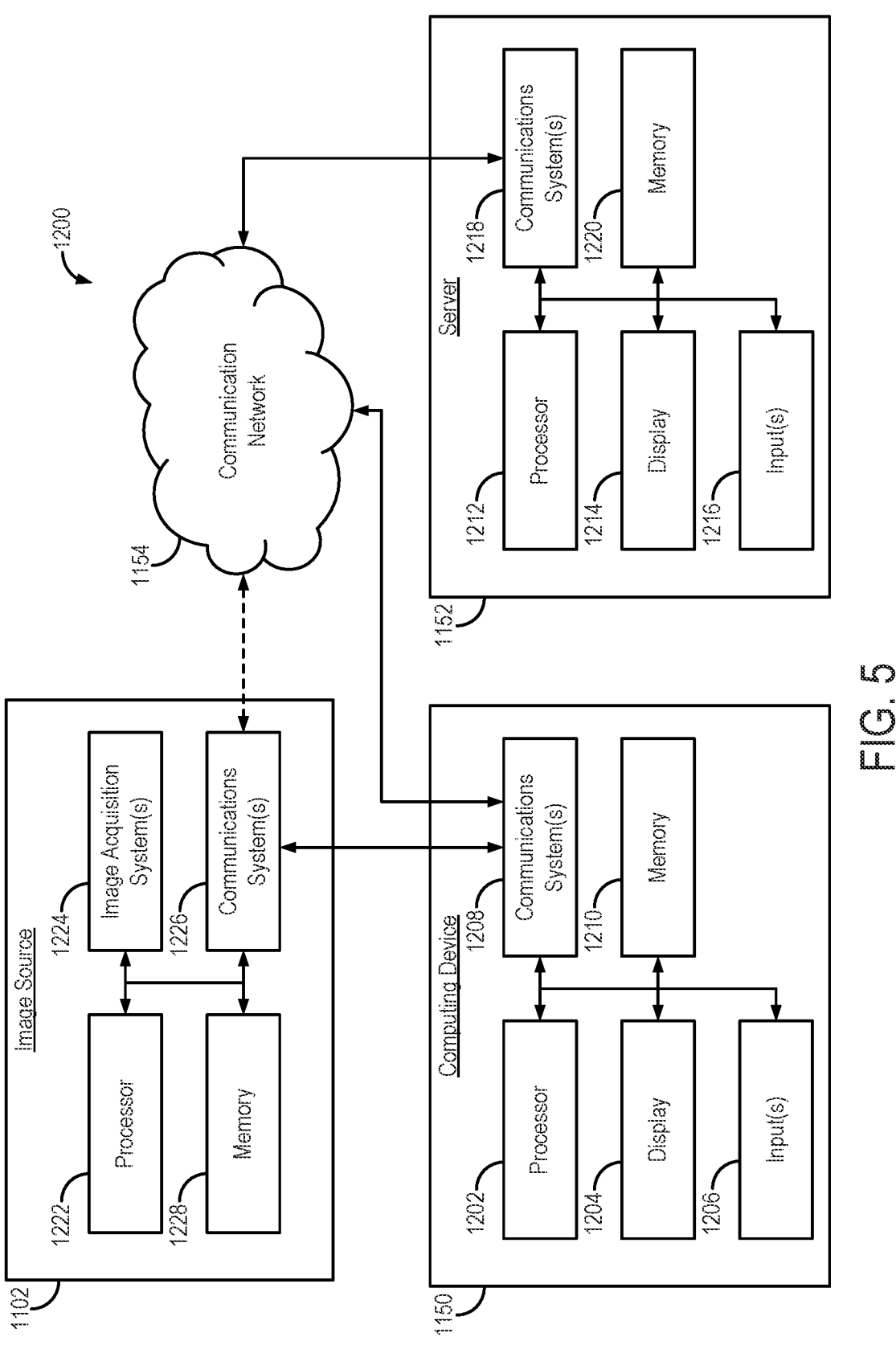
FIG. 5 is a block diagram of components that can implement the microvessel image generation system of FIG. 4.

Referring now to FIG. 5, an example of hardware 1000 that can be used to implement image source 902, computing device 950, and server 952 in accordance with some embodiments of the systems and methods described in the present disclosure is shown. As shown in FIG. 5, in some embodiments, computing device 950 can include a processor 1002, a display 1004, one or more inputs 1006, one or more communication systems 1008, and/or memory 1010. In some embodiments, processor 1002 can be any suitable hardware processor or combination of processors, such as a central processing unit ("CPU"), a graphics processing unit ("GPU"), and so on. In some embodiments, display 1004 can include any suitable display devices, such as a computer monitor, a touchscreen, a television, and so on. In some embodiments, inputs 1006 can include any suitable input devices and/or sensors that can be used to receive user input, such as a keyboard, a mouse, a touchscreen, a microphone, and so on.

In some embodiments, communications systems 1008 can include any suitable hardware, firmware, and/or software for communicating information over communication network 954 and/or any other suitable communication networks. For example, communications systems 1008 can include one or more transceivers, one or more communication chips and/or chip sets, and so on. In a more particular example, communications systems 1008 can include hardware, firmware and/or software that can be used to establish a Wi-Fi connection, a Bluetooth connection, a cellular connection, an Ethernet connection, and so on.

In some embodiments, memory 1010 can include any suitable storage device or devices that can be used to store instructions, values, data, or the like, that can be used, for example, by processor 1002 to present content using display 1004, to communicate with server 952 via communications system(s) 1008, and so on. Memory 1010 can include any suitable volatile memory, non-volatile memory, storage, or any suitable combination thereof. For example, memory 1010 can include RAM, ROM, EEPROM, one or more flash drives, one or more hard disks, one or more solid state drives, one or more optical drives, and so on. In some embodiments, memory 1010 can have encoded thereon, or otherwise stored therein, a computer program for controlling operation of computing device 950. In such embodiments, processor 1002 can execute at least a portion of the computer program to present content (e.g., images, user interfaces, graphics, tables), receive content from server 952, transmit information to server 952, and so on.

In some embodiments, server 952 can include a processor 1012, a display 1014, one or more inputs 1016, one or more communications systems 1018, and/or memory 1020. In some embodiments, processor 1012 can be any suitable hardware processor or combination of processors, such as a CPU, a GPU, and so on. In some embodiments, display 1014 can include any suitable display devices, such as a computer monitor, a touchscreen, a television, and so on. In some embodiments, inputs 1016 can include any suitable input devices and/or sensors that can be used to receive user input, such as a keyboard, a mouse, a touchscreen, a microphone, and so on.

In some embodiments, communications systems 1018 can include any suitable hardware, firmware, and/or software for communicating information over communication network 954 and/or any other suitable communication networks. For example, communications systems 1018 can include one or more transceivers, one or more communication chips and/or chip sets, and so on. In a more particular example, communications systems 1018 can include hardware, firmware and/or software that can be used to establish a Wi-Fi connection, a Bluetooth connection, a cellular connection, an Ethernet connection, and so on.

In some embodiments, memory 1020 can include any suitable storage device or devices that can be used to store instructions, values, data, or the like, that can be used, for example, by processor 1012 to present content using display 1014, to communicate with one or more computing devices 950, and so on. Memory 1020 can include any suitable volatile memory, non-volatile memory, storage, or any suitable combination thereof. For example, memory 1020 can include RAM, ROM, EEPROM, one or more flash drives, one or more hard disks, one or more solid state drives, one or more optical drives, and so on. In some embodiments, memory 1020 can have encoded thereon a server program for controlling operation of server 952. In such embodiments, processor 1012 can execute at least a portion of the server program to transmit information and/or content (e.g., data, images, a user interface) to one or more computing devices 950, receive information and/or content from one or more computing devices 950, receive instructions from one or more devices (e.g., a personal computer, a laptop computer, a tablet computer, a smartphone), and so on.

In some embodiments, image source 902 can include a processor 1022, one or more image acquisition systems 1024, one or more communications systems 1026, and/or memory 1028. In some embodiments, processor 1022 can be any suitable hardware processor or combination of processors, such as a CPU, a GPU, and so on. In some embodiments, the one or more image acquisition systems 1024 are generally configured to acquire data, images, or both, and can include an ultrasound imaging system. Additionally or alternatively, in some embodiments, one or more image acquisition systems 1024 can include any suitable hardware, firmware, and/or software for coupling to and/or controlling operations of an ultrasound imaging system. In some embodiments, one or more portions of the one or more image acquisition systems 1024 can be removable and/or replaceable.

Note that, although not shown, image source 902 can include any suitable inputs and/or outputs. For example, image source 902 can include input devices and/or sensors that can be used to receive user input, such as a keyboard, a mouse, a touchscreen, a microphone, a trackpad, a trackball, and so on. As another example, image source 902 can include any suitable display devices, such as a computer monitor, a touchscreen, a television, etc., one or more speakers, and so on.

In some embodiments, communications systems 1026 can include any suitable hardware, firmware, and/or software for communicating information to computing device 950 (and, in some embodiments, over communication network 954 and/or any other suitable communication networks). For example, communications systems 1026 can include one or more transceivers, one or more communication chips and/or chip sets, and so on. In a more particular example, communications systems 1026 can include hardware, firmware and/or software that can be used to establish a wired connection using any suitable port and/or communication standard (e.g., VGA, DVI video, USB, RS-232, etc.), Wi-Fi connection, a Bluetooth connection, a cellular connection, an Ethernet connection, and so on.

In some embodiments, memory 1028 can include any suitable storage device or devices that can be used to store instructions, values, data, or the like, that can be used, for example, by processor 1022 to control the one or more image acquisition systems 1024, and/or receive data from the one or more image acquisition systems 1024; to images from data; present content (e.g., images, a user interface) using a display; communicate with one or more computing devices 950; and so on. Memory 1028 can include any suitable volatile memory, non-volatile memory, storage, or any suitable combination thereof. For example, memory 1028 can include RAM, ROM, EEPROM, one or more flash drives, one or more hard disks, one or more solid state drives, one or more optical drives, and so on. In some embodiments, memory 1028 can have encoded thereon, or otherwise stored therein, a program for controlling operation of image source 902. In such embodiments, processor 1022 can execute at least a portion of the program to generate images, transmit information and/or content (e.g., data, images) to one or more computing devices 950, receive information and/or content from one or more computing devices 950, receive instructions from one or more devices (e.g., a personal computer, a laptop computer, a tablet computer, a smartphone, etc.), and so on.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (e.g., hard disks, floppy disks), optical media (e.g., compact discs, digital video discs, Blu-ray discs), semiconductor media (e.g., random access memory ("RAM"), flash memory, electrically programmable read only memory ("EPROM"), electrically erasable programmable read only memory ("EEPROM")), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

The present disclosure has described one or more preferred embodiments, and it should be appreciated that many equivalents, alternatives, variations, and modifications, aside from those expressly stated, are possible and within the scope of the invention.

The invention claimed is:

1. A method for generating an image that depicts microvessels in a subject using an ultrasound system, the steps of the method comprising:
   (a) accessing with a computer system, ultrasound data acquired from a subject with an ultrasound system, wherein the ultrasound data comprise image frames obtained at a plurality of different time points;
   (b) generating spatiotemporal matrix data with the computer system by reformatting the ultrasound data as a Casorati matrix;
   (c) determining image frames that meet a similarity threshold;
   (d) generating local spatiotemporal clutter-filtered data with the computer system by inputting the determined image frames that meet the similarity threshold to a clutter filter;
   (e) determining pixels related to flow-signal and background signal in the local spatiotemporal clutter-filtered data;
   (f) generating a synthetic noise image with the computer system based on replacing select flow-signal pixels in the local spatiotemporal clutter-filtered data with background signal pixel values;
   (g) estimating background noise field data from the synthetic noise image using the computer system; and
   (h) generating a noise-suppressed image with the computer system by normalizing the image using the background noise field data, wherein the noise-suppressed image depicts microvessels in the subject.

2. The method as recited in claim 1, wherein replacing select flow-signal pixels with background signal pixel values includes randomly selecting the background signal pixels.

3. The method as recited in claim 1, wherein values of the background signal pixels are depth-matched to be consistent with time gain compensation settings for the ultrasound system.

4. The method as recited in claim 1, further comprising generating synthetic noise images for all obtained image frames.

5. The method as recited in claim 4, wherein estimating background noise field data includes averaging the generated synthetic noise images.

6. The method as recited in claim 1, wherein the similarity threshold for image frames is equal to or greater than 0.8.

7. The method as recited in claim 1, wherein the background noise field data are estimated by computing a low-rank approximation of the synthetic noise image.

8. The method as recited in claim 7, wherein the low-rank approximation is based on a singular value decomposition.

9. The method as recited in claim 1, wherein generating the synthetic noise image comprises replacing each flow pixel in the local spatiotemporal clutter-filtered data with a noise pixel randomly selected from different image frames in the ultrasound data.

10. The method as recited in claim 1, wherein the clutter filter is implemented with a singular value decomposition.

11. A system for generating an image that depicts microvessels in a subject, the system comprising:
   an ultrasound system configured to acquire ultrasound data from a subject;
   a computer system configured to:
      (i) access the ultrasound data acquired from the subject, wherein the ultrasound data comprise image frames obtained at a plurality of different time points;
      (ii) generate spatiotemporal matrix data by reformatting the ultrasound data as a Casorati matrix;

(iii) determine image frames that meet a similarity threshold;

(iv) generate local spatiotemporal clutter-filtered data by inputting the determined image frames that meet the similarity threshold to a clutter filter;

(v) determine pixels related to flow-signal and background signal in the local spatiotemporal clutter-filtered data;

(vi) generate a synthetic noise image based on replacing select flow-signal pixels in the local spatiotemporal clutter-filtered data with background signal pixel values;

(vii) estimate background noise field data from the synthetic noise image; and (viii) generate a noise-suppressed image by normalizing the image using the background noise field data, wherein the noise-suppressed image depicts microvessels in the subject.

12. The system as recited in claim 11, wherein the computer system is further configured to replace select flow-signal pixels with background signal pixel values by randomly selecting the background signal pixels.

13. The system as recited in claim 11, wherein the computer system is further configured to depth-match values of the background signal pixels to be consistent with time gain compensation settings for the ultrasound system.

14. The system as recited in claim 11, wherein the computer system is further configured to generate synthetic noise images for all obtained image frames.

15. The system as recited in claim 14, wherein the computer system is further configured to estimate background noise field data by averaging the generated synthetic noise images.

16. The system as recited in claim 11, wherein the similarity threshold for image frames is equal to or greater than 0.8.

17. The system as recited in claim 11, wherein the computer system is further configured to estimate the background noise field data by computing a low-rank approximation of the synthetic noise image.

18. The system as recited in claim 17, wherein the low-rank approximation is based on a singular value decomposition.

19. The system as recited in claim 11, wherein the computer system is further configured to generate the synthetic noise image by replacing each flow pixel in the local spatiotemporal clutter-filtered data with a noise pixel randomly selected from different image frames in the ultrasound data.

20. The system as recited in claim 11, wherein the computer system is further configured to implement the clutter filter with a singular value decomposition.

* * * * *